United States Patent
Hodshire

[15] 3,702,512
[45] Nov. 14, 1972

[54] FISH CATCHING INSTRUMENTALITY
[72] Inventor: Vincent B. Hodshire, 2701 N.E. Adams Street, Peoria, Ill. 61602
[22] Filed: May 17, 1971
[21] Appl. No.: 144,130

[52] U.S. Cl. .................................................43/15
[51] Int. Cl. ................................................A01k 97/00
[58] Field of Search..........................................43/15

[56] References Cited

UNITED STATES PATENTS

| 283,444 | 8/1883 | Wentworth.....................43/15 |
| 1,989,407 | 1/1935 | Ezell..............................43/15 |
| 2,589,533 | 3/1952 | Buchner........................43/15 |
| 2,858,634 | 11/1958 | Bremer, Jr.....................43/15 |

FOREIGN PATENTS OR APPLICATIONS

| 171,951 | 7/1952 | Austria..........................43/15 |
| 1,045,731 | 7/1953 | France...........................43/15 |

Primary Examiner—Samuel Koren
Assistant Examiner—Daniel J. Leach
Attorney—Molinare, Allegretti, Newitt & Witcoff

[57] ABSTRACT

A fish catching instrumentality, including means for selectively adjusting the tension on a dual set trigger lever mechanism, to provide for variable release of a relay trigger lever fish engaging member. The dual set trigger lever mechanism includes a trigger lever with first and second arm portions. The trigger lever is pivotally mounted to a frame on which the relay trigger lever fish engaging member is mounted. In one form of the invention, resilient means adjustably engage the first arm of the trigger lever while the second arm releasably retains the relay trigger lever fish engaging member in a cocked position. By adjusting the engagement between the resilient means and the first arm of the lever, the tension to release the relay trigger lever fish engaging member can be varied. In another form of the invention, the resilient means may adjustably engage the second arm.

14 Claims, 5 Drawing Figures

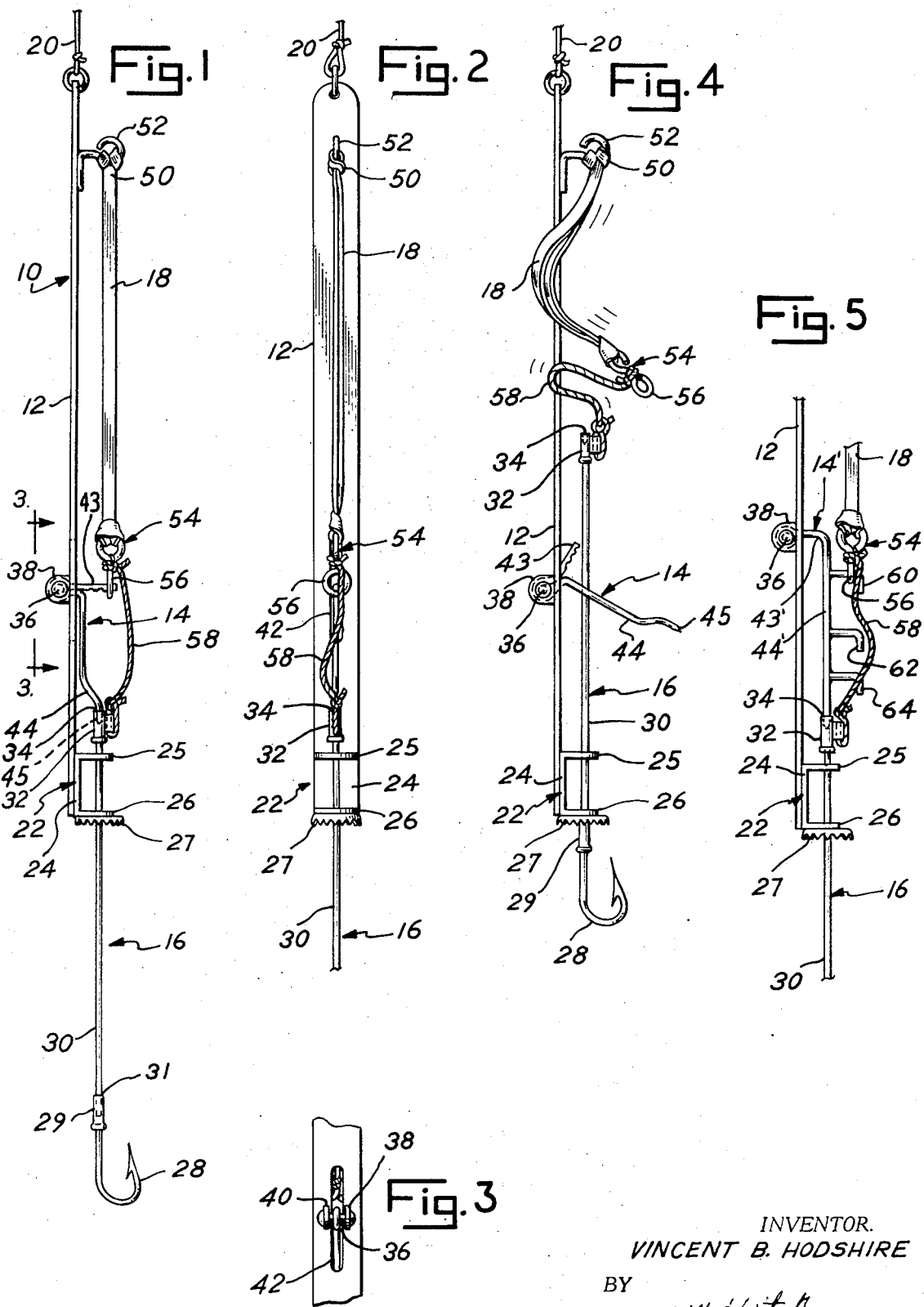

3,702,512

FISH CATCHING INSTRUMENTALITY

BACKGROUND OF THE INVENTION

This invention relates to an improved fish catching instrumentality. Prior attempts have been made to provide a device to respond to a fish biting on a fishhook or to simulate the response of jerking of a hook by the fisherman as the fish strikes at the bait. The prior art devices have generally failed to achieve popularity or wide use due to their complex structure, costly manufacturing and lack of an adequate releasing mechanism. The prior art as disclosed in Wenger U.S. Pat. No. 611,400; Sweet U.S. Pat. No. 1,072,672; Partello U.S. Pat. No. 1,399,648; Sprongel U.S. Pat. No. 1,604,725; Thompson U.S. Pat. No. 2,260,923; Penninger U.S. Pat. No. 2,619,759; Gardner U.S. Pat. No. 2,640,291; Loomis U.S. Pat. No. 2,795,074; and Zalonis U.S. Pat. No. 2,889,656, relate to fish catching devices, but none of these patents disclose the improved fish catching device including a releasable retaining trigger lever member adjustable to vary the release tension of the relay trigger fish engaging member, as in the present invention.

Wenger U.S. Pat. No. 611,400, for example, does disclose a lever pivoting on a frame and engaging a spear to hold same in a retracted position against the biasing of a spring. The lever is permanently connected to a fishhook at one end, and the other end is engageable with an abutment shoulder on an end of the spear. A fish nibbling at the bait on the hook displaces the hook which causes the lever to pivot, thus releasing the spear which is biased toward the hook. There is no disclosure in Wenger of the novel subject matter of this case nor is there any teaching of an adjustable dual set trigger lever mechanism released by a relay trigger fish engaging member for a jerking-type fish catching device. A fish catching instrumentality of the type to which the present invention is in improvement of is shown in copending application, Ser. No. 876,330 for a "Fish Catching Instrumentality" filed Nov. 13, 1969 by V. B. Hodshire, the inventor herein, now U.S. Pat. No. 3,618,251 issued Nov. 9, 1971.

SUMMARY OF THE INVENTION

In a principal aspect the invention relates to a fish catching instrumentality which includes a frame with a relay trigger lever fish engaging member mounted on the frame for movement between a cocked position and a released position. A trigger lever member is pivotally mounted on the frame to move from the set position holding the relay trigger lever fish engaging member in a cocked position to a tripped position releasing the relay trigger lever fish engaging member. Resilient means are provided for urging the fish engaging member toward the released position. The trigger lever member in the set position engages both the resilient means and the relay trigger lever fish engaging member, hence, the term "dual set trigger member". The engagement between the resilient means and the dual set trigger lever member is adjustable to vary the tension on the relay trigger lever fish engaging member, thus controlling the release of the relay trigger lever fish engaging member.

A principal object of this invention is to provide an improved, simple and economically constructed fish catching instrumentality.

A further object of the present invention is to provide a fish catching mechanism which avoids nuisance tripping.

Another object of this invention is to provide a dual set trigger lever mechanism to allow adjustment of the release tension on the relay trigger lever fish engaging member.

Still another object of the present invention is to provide a fish catching instrumentality which operates independently of any fixed position of the fish engaging member. Other objects and advantages of this invention will be made more apparent in the description which follows.

BRIEF DESCRIPTION OF THE DRAWINGS

There is illustrated in the drawing presently preferred forms of the invention wherein:

FIG. 1 is a side elevational view of the fish catching instrumentality of the present invention with the trigger lever member in the set position and the relay trigger fish engaging member illustrated in the cocked position;

FIG. 2 is a front elevational view of the invention of FIG. 1 with the hook portion of the fish engaging member omitted;

FIG. 3 is a detailed rear elevational view taken generally along line 3—3 of FIG. 1, illustrating the pivot mounting of the trigger lever member;

FIG. 4 is a side elevational view of the invention with the trigger lever member illustrated in the tripped position and the relay trigger fish engaging member illustrated in the released position; and FIG. 5 is a fragmentary side elevational view illustrating a second embodiment of the trigger lever member of the invention in the set position.

DESCRIPTION OF THE PREFERRED EMBODIMENT

Referring now to the drawings, wherein like numbers refer to like parts, the fish catching instrumentality 10 illustrated in FIG. 1 includes an elongated frame 12 having a dual set trigger lever member 14 pivotally mounted thereon. Dual set trigger lever member 14 is shown in set position engaging a relay trigger fish engaging member 16 and resilient means 18. Frame 12 comprises an upper end of the frame whereon a fishing line 20 is attached thereto, and a generally U-shaped member 22 secured to the lower end. U-shaped member 22 has a base portion 24 secured to frame 12, and parallel horizontally extending legs or frame portions 25 and 26 at opposite ends of base 24. Spaced apart frame portions 25 and 26 include aligned openings that define guide means for fish engaging member 16.

The fish engaging member 16 is slidably mounted within the guide means defined by the openings in frame portions 25 and 26. Saw tooth disk 27 is attached to the bottom of frame portion 26 and cooperates with fish engaging member 16 as will be discussed in the operational description of the invention. The fish engaging member 16 includes a fish hook 28 that is secured to the lower end of fish engaging member 16 by suitable connection means, as for example, by an internally threaded sleeve 29 at the upper end of the fishhook 28 making a threaded connection with an externally threaded portion at the lower end of the shank portion 30 of the fish engaging member 16. The upper end of the sleeve 29 defines stop or seat 31 which, when fish engaging member 16 is in released position, engages disk 27 to stop movement upward of member 16 without damaging fishhook 28. The shank portion 30 of fish engaging member 16 is circular in cross-section allowing rotation of fishhook 28 without adversely affecting the fish catching operation.

If desired, the present invention can be applied to a jerking-type device for jerking a fishhook upwardly to sink a hook into the fish, as shown for example, in FIGS. 11 and 12 of my copending application, Ser. No. 876,330, filed Nov. 13, 1969. In such case, the disk member 27 would be removed and a spear member substituted in its place. Line 20 could be joined to an adaptor secured to eyelet 52, for example, or tied to the frame 12, and a line and hook would be substituted for hook 28. The operation of the dual set trigger lever mechanism would be essentially the same as described above.

Sleeve 32 is fixed to the upper end of the shank portion 30 of the fish engaging member 16. Sleeve 32 includes an upwardly facing opening 34 in the upper end thereof, and opening 34 forms the female portion of a male and female connection means for releasably retaining the fish engaging member 16 in the cocked position.

Fish engaging member retaining means include trigger lever member or lever 14 pivotally mounted on frame 12 about fulcrum pin 36 for movement from a set position holding the fish engaging member 16 in cocked position (FIG. 1) to a tripped position releasing the fish engaging member 16 (FIG. 4). Trigger lever member 14 comprises a lever having a first relatively short arm portion 43 and a second relatively long arm portion 44 joined together in a substantially perpendicular relationship with the plane defined by pivoting arms 43 and 44 being generally perpendicular to the plane of frame 12. The pivot axis for the trigger lever member 14 is an axis substantially through the juncture of arm portions 43 and 44. The male portion of the releasable connection means is defined by the end portion 45 of arm 44 of trigger lever member 14. The end portion 45 of arm 44 is detachably insertable into opening 34 of sleeve 32. Thus, it is seen that the longer arm 44 of trigger lever member 14 cooperates with the upper end of fish engaging member 16 to provide releasable connection means. It will be understood that the male and female portions of the releasable connection means could be reversed without altering the function of the connection.

Resilient means 18 tension the trigger lever member 14 and urge the fish engaging member upwardly relative to the frame 12. The end 50 of the resilient means 18 which may include an elastic band made from rubber as shown, or a spring made from metal, is secured by an eyelet 52 located at the top of frame 12. The other end of resilient means 18 includes trigger arm engaging means 54, which may be in the form of an eyelet or hook 56. Trigger lever arm engaging means 54 and hence resilient means 18 are connected to sleeve 32 on fish engaging member 16 via lost motion member 58. The eyelet portion of trigger arm engaging means 54 is shown engaging arm 43 of trigger lever member 14. As seen in FIG. 2, the eyelet 54, resilient means 18, trigger lever member 14 and fish engaging member 16 are in substantially vertical alignment.

The trigger lever member 14 pivots about fulcrum pin 36. FIG. 3 shows fulcrum pin 36 mounted in fulcrum pin mounting members 38 and 40. Slot 42 enables the trigger lever member 14 to extend therethrough to pivot about pin 36 located on the opposite side of frame 12. Though in the disclosed embodiment of the invention, fulcrum 36 is on the side of frame 12 opposite the trigger lever member 14, it will be understood that the fulcrum pin could be secured on the opposite side of the frame 12 or perpendicular to the frame. Thus, instead of pivoting in a plane generally at right angles to the frame, the trigger lever member could pivot in a plane substantially parallel to the plane of the frame 12.

OPERATION

In use, the trigger lever member 14 is moved to the position of FIG. 1 and the male end 45 of arm 44 is inserted into female end opening 34 of sleeve 32 of fish engaging member 16, thereby establishing the releasable connection between the trigger lever member 14 and the fish engaging member 16. The movement downward of fish engaging member 16 tensions the resilient means 18 and locates trigger arm engaging means 54 and eyelet 56 near horizontally extending arm 43 of trigger lever member 14. The eyelet portion 56 of trigger arm engaging means 54 is then looped over and into engagement with the arm 43. In this manner, the major tension in the trigger lever member 14 is carried by arm 43 and part of the tension is conveyed through the arm 44 to the releasable connection between the trigger lever member 14 and fish engaging member 16. Thus, a constant but light pressure is maintained at this releasable connection point. When the fish engaging member is moved by a fish nibbling on bait (not shown) located on fishhook 28, the releasable connection is broken as the longer arm portion 45 of trigger lever member 14 is disengaged from sleeve 32 and resilient means 18 cause trigger lever member 14 to pivot on fulcrum pin 36 to a tripped position as illustrated in FIG. 4. Lost motion member 58, connected to resilient means 18, is pulled upward. As lost motion member 58 is connected to fish engaging member 16 via sleeve 32, the fish engaging member 16 is in turn urged upward to its released position as illustrated in FIG. 4 to implant the hook 28 at the end thereof firmly in the fish's mouth. The fish engaging member 16 is moved suddenly and the hook 28 thereby reacts as a hammer blow to drive the hook into firm engagement with the mouth of the fish. The lost motion member 58 may comprise a loose pliable rope-like member or string made from metal, plastic or fabric. The amount of slack in member 58 is adjustable to increase or decrease the force with which the fish engaging member is drawn upwardly to effect the hammer action on hook 28.

The mode of operation can also be explained in another way. The frame 12 supports the relay trigger lever fish engaging member 16 for linear movement. In one position the relay trigger lever fish engaging member 16 is spaced from the longest effective end of the trigger lever 14 and in a second position the relay trigger lever fish engaging member 16 is engaged with the longest effective end of the trigger lever 14 for anchoring or holding same. When the trigger lever 14 is held by the relay trigger lever fish engaging member 16, the resilient means 18, which is engaged with the short arm portion 43 of the trigger lever 14 is held tensioned or cocked (FIG. 1). When the fish bites the bait on hook 28 and the fish engaging member 16 is moved relative to frame 12, the relay trigger lever fish engaging member 16 releases from the longest effective end 45 of the trigger lever 14, and the trigger lever 14 pivots to release the eyelet 56 and permit the resilient means 18 to return to untensioned position. As the resilient means 18 moves, it will through the lost motion connection 58 with the fish engaging member 16 activate same to firmly implant the hook 28 in the mouth of the fish. The relay trigger lever fish engaging member 16 thus acts as an anchor and upon release of that anchor from the longer arm portion of the trigger lever member, permits the trigger lever member to release the spring or resilient member 18 and spring or resilient member 18 then activates the relay trigger lever fish engaging member 16 through the lost motion connection which operatively connects the resilient means and the relay trigger lever fish engaging member.

As noted earlier, the fish engaging member shank 30 may be circular in cross-section, thereby allowing for rotation of member 16 and fishhook 28 attached thereto. Fishhook 28 cooperates with saw tooth disk 27 to trap the head of a fish regardless of rotation of the member 16. If desired, a downwardly extending spear could be substituted for disk 27. In such case, shank 30 would be non-circular and retained in complementary non-circular guide means so as to maintain alignment between hook 28 and the spear.

The adjustment of the trigger lever member release tension depends on the placement of eyelet portion 56 on arm 43 of the trigger lever member 14. Arm 43 has notches intermittently along its length to allow engagement of portion 56 of trigger lever arm engaging means 54 at various distances from fulcrum pin 36. The further from the fulcrum pin 36 that portion 56 is located, the more tension is increased on trigger lever member 14 and hence tension is increased on the relay trigger lever fish engaging member. If the adjustment feature is not needed, then the eyelet 56 could be joined to arm 44 below the pivot (FIG. 1) or arm 44' between the pivot and first hook (FIG. 5).

The fisherman can place the resilient means connection at whatever point he wishes on arm 43 and thus determines the force necessary to release the relay trigger fish engaging member which in the illustrated form of the invention is a male-female connection. Thus, a very sensitive trip can be had when small fish are sought or a less sensitive relay trigger lever can be set for larger fish. It is seen that the frame movably supports the relay trigger lever fish engaging member 16 and the relay trigger lever fish engaging member is engaged by the dual set trigger lever 14. Resilient means or urging means 18, which may be, for example, a resilient band of rubber, a metal coil spring or the like, engages with the trigger lever member 14 and is tensioned to retain the trigger lever member in cocked position.

An alternate embodiment of the invention is shown in FIG. 5 wherein the trigger lever member 14 includes arms 43' and 44' and eyelet 56 can be placed on hooks 60, 62 or 64 located on the longer effective arm 44' of trigger lever member 14'. In this manner, the tension at the male-female connection between the trigger lever member 14' and fish engaging member 16 is adjustable and the fish catching instrumentality operates as hereinbefore described.

The present invention provides an improved fish catching instrumentality comprising a frame having guide means thereon, with a relay trigger lever fish engaging member mounted for movement in the guide means between a cocked position and a released position. Resilient means urge the relay trigger lever fish engaging member toward said released position and a trigger lever member having a first arm and a second longer arm is pivotally mounted for movement from set position to tripped position. The second longer arm is engageable with the relay trigger lever fish engaging member for holding the relay trigger lever fish engaging member in the cocked position, whereby when said second longer arm of said trigger lever member is disengaged from the relay trigger lever fish engaging member, the resilient means moves the relay trigger lever fish engaging member from said cocked position to said released position. Further, the present invention enables adjustment of the release tension of the trigger lever member, that is, the release can be set for large fish or small fish, so nuisance tripping can be avoided. In addition, the device can be constructed to operate independently of any set location of the fishhook through the cooperation of the hook and saw tooth disk.

The present invention is not limited to the preferred forms illustrated, but may be otherwise embodied within the scope of the following claims.

I claim:

1. A fish catching instrumentality including a frame, a relay trigger lever fish engaging member movably mounted on the frame for movement between a cocked position and a released position; resilient means urging said fish engaging member toward said released position; and retaining means for releasably retaining said fish engaging member in the cocked position; said retaining means comprising: a dual set trigger lever member pivotally mounted on the frame for movement from a set position holding the relay trigger lever fish engaging member in cocked position to tripped position releasing said fish engaging member to permit said fish engaging member to be moved to said released position by said resilient means, said trigger lever member in said set position engaging both said resilient means and said fish engaging member.

2. A fish catching instrumentality as set forth in claim 1 in which said engagement between said resilient means and said trigger lever member is adjustable so as to vary the tension on said relay trigger lever member, thereby controlling the release of said fish engaging member from said cocked position.

3. A fish catching instrumentality as set forth in claim 1 in which the trigger lever member comprises a lever having first and second arm portions joined together, said trigger lever member being pivotally mounted on said frame at the juncture of said arm portions, said first arm portion adjustably engaging said resilient means, and said second arm engaging said fish engaging member.

4. A fish catching instrumentality as set forth in claim 1 in which said resilient means has first and second ends, said first end mounted to said frame, and said second end having means to engage said first arm portion of said trigger lever member.

5. A fish catching instrumentality as set forth in claim 3 in which said first arm portion has notches spaced intermittently along its length, said notches adapted to engage said means on said second end of said resilient means whereby said tension is varied depending on which notch is engaged.

6. A fish catching instrumentality as set forth in claim 3 in which said second arm portion of said trigger member is releasable from said fish engaging member by means of an interengageable male and female connection, said fish engaging member having first and second ends, said first end including a sleeve with an opening therein that forms said female member of said releasable means, said second arm portion forming the male portion of said releasable means, and said second arm portion being detachably engaged with said sleeve.

7. A fish catching instrumentality as set forth in claim 1 in which the resilient means includes a lost motion member connected between said fish engaging member and said first arm portion engaging means on said second end of said resilient means, whereby when the trigger member is released from said fish engaging member, said fish engaging member will be moved suddenly to firmly engage the fish.

8. A fish catching instrumentality as set forth in claim 1 in which said resilient means includes a band of elastic material, said band being adjustably engageable with said trigger lever member, said band also being connected by said lost motion member to said fish engaging member, whereby when said trigger lever member is released from said fish engaging member, said band of elastic material jerks said fish engaging member toward said released position.

9. A fish engaging instrumentality as set forth in claim 1 in which a saw tooth disk on said frame cooperates with said fish engaging member regardless of rotation of said fish engaging member.

10. A fish engaging instrumentality as set forth in claim 1 in which the trigger lever member comprises first and second arm portions, said trigger lever member being pivotally mounted on said frame at one end of said first arm portion, said second arm portion having hooks attached along its length, said hooks adapted to engage said means on said second end of said resilient means whereby said tension is varied depending on which hook is engaged.

11. A fish engaging instrumentality as in claim 7 in which the lost motion member is adjustable in order to vary the force with which the fish engaging member is moved suddenly to firmly engage the fish.

12. A fish catching instrumentality as set forth in claim 1 in which the trigger lever member comprises a lever having first and second arm portions, said first arm portion adjustably engaging said resilient means, and said second arm portion engaging said fish engaging member.

13. A fish catching instrumentality comprising a frame having guide means thereon; a relay trigger lever fish engaging member mounted for movement in the guide means between a cocked position and a released position; resilient means urging said relay trigger lever fish engaging member toward said released position; and retaining means for releasably retaining said relay trigger lever fish engaging member in the cocked position, said retaining means including a trigger lever member pivotally mounted for movement from a set position holding the relay trigger lever fish engaging member in cocked position to tripped position releasing said relay trigger lever fish engaging member to permit said relay trigger lever fish engaging member to be moved to said released position by said resilient means, said trigger lever member including a first arm and a second longer arm, the second longer arm being engageable with said relay trigger lever fish engaging member for holding said relay trigger lever fish engaging member in the cocked position, whereby when said second longer arm of said trigger lever member is disengaged from said relay trigger lever fish engaging member, said resilient means moves said relay trigger lever fish engaging member from said cocked position to said released position.

14. A fish catching instrumentality including a frame, a trigger lever member pivotally mounted on the frame, said trigger lever member having a first arm portion and a second longer arm portion, resilient means on the frame adapted to be engaged with the trigger lever member, a relay trigger lever fish engaging member on the frame movable between a position engaging the second arm portion of the trigger lever member to hold the resilient means tensioned to a position released from the trigger lever member, said resilient means being operatively connected to said relay trigger lever fish engaging member through a lost motion connection, whereby when the relay trigger lever fish engaging member is moved relative to the frame, the relay trigger lever fish engaging member releases the longer arm portion of the trigger lever member, permitting the trigger lever member to release the resilient means, which then through the lost motion connection with the relay trigger lever fish engaging member activates the relay trigger lever fish engaging member.

* * * * *